United States Patent [19]

Lem

[11] Patent Number: 4,511,030
[45] Date of Patent: Apr. 16, 1985

[54] ARTICLE ACCUMULATING CONVEYOR SYSTEM

[75] Inventor: Hans J. Lem, Mahwah, N.J.

[73] Assignee: Air Lane Systems Inc., Fairfield, N.J.

[21] Appl. No.: 479,254

[22] Filed: Mar. 28, 1983

[51] Int. Cl.³ ............................................. B65G 47/74
[52] U.S. Cl. .................................. 198/633; 198/955; 198/460
[58] Field of Search ............... 198/460, 633, 810, 775, 198/955, 751, 459

[56] References Cited

U.S. PATENT DOCUMENTS

| | | | |
|---|---|---|---|
| 3,121,490 | 2/1964 | Rainbow | 198/633 |
| 3,650,376 | 3/1972 | Burgis et al. | 198/633 |
| 3,934,707 | 1/1976 | Bowman | 198/460 |
| 4,029,198 | 4/1977 | Lingl, Jr. | 198/460 X |
| 4,149,626 | 4/1979 | Holt | 198/460 X |
| 4,358,010 | 11/1982 | Besch | 198/955 X |

*Primary Examiner*—Joseph E. Valenza
*Assistant Examiner*—Dennis Williamson
*Attorney, Agent, or Firm*—Henry D. Pahl, Jr.

[57] ABSTRACT

In the conveyor system disclosed herein, a plurality of elongate lifting assemblies are interleaved with parallel moving belts on which articles are transported. Each lifting assembly utilizes an air bag which is supported in an upwardly facing, rigid, U-shaped channel and which, when inflated, lifts a longitudinally-flexible, inverted, U-shaped channel member. The channel members include respective lips which engage and locally limit upward movement of the inverted channel member to a height sufficient for lifting articles on the conveyor out of driving contact with the moving belts. The ends of the inverted channel members are fixed or fastened with the upper surface of that part of the inverted channel below the level of the moving belts. Accordingly, when the air bags are inflated, the moving belts can drive successive articles up on to the resulting ramp surface of the inverted channels without developing crushing pressures between adjacent articles.

5 Claims, 4 Drawing Figures

ARTICLE ACCUMULATING CONVEYOR SYSTEM

BACKGROUND OF THE INVENTION

The present invention relates to a conveyor system and more particularly to apparatus which facilitates the accumulation of a succession of the articles being transported.

While the prior art has contemplated various schemes for temporarily diverting or accumulating articles which are otherwise being transported along a conveyor system, such diverting and accumulating systems have typically required elaborate controls or mechanics to prevent the developing of crushing pressures between successive articles. Typically it has been necessary to provide a holding or accumulator section for each article to be temporarily stopped along the conveyor line and to provide logic mechanical or other interrelating the operations of the successive holding stations to effect an elaborate first in/first out gating of articles from one section to the next.

Among the several objects of the present invention may be noted the provision of apparatus for accumulating articles which are being transported on continuously moving parallel belts; the provision of such apparatus which will accumulate a plurality of articles without developing crushing pressures between such articles; the provision of such apparatus which facilitates the use of relatively simple control systems; the provision of such apparatus which is highly reliable; the provision of such apparatus which is easily assembled and is of relatively simple and inexpensive construction. Other objects and features will be in part apparent and in part pointed out hereinafter.

SUMMARY OF THE INVENTION

The accumulator apparatus of the present invention is intended to be used in a conveyor system of the type in which articles are transported on continuously moving parallel belts. In accordance with the invention, a plurality of elongate lifting assemblies are interleaved with the belts. Each of the lifting system includes an elongate air bag supported in a U-shaped rigid channel member, the width of each channel being comparable to that of one of the belts. An inwardly facing lip is provided on each side of the U-shaped channel. An inverted U-shaped channel member overlies the air bag, the inverted channel member being relatively flexible in the longitudinal direction and having an upper surface constructed of a material exhibiting a very low coefficient of friction. On each side of the inverted channel member, an outwardly facing lip is provided which is adapted to engage the respective inwardly facing lip on the fixed rigid channel and to thereby locally limit upward movement of the inverted channel member upon inflation of the air bag. The upward movement of the inverted channel is limited to a height sufficient for lifting articles being transported on the conveyor out of driving contact with the moving belts. Each end of the inverted channel member is fixed with respect to the rigid channel to hold the upper surface of that part of the inverted channel below the level of the moving belts. Accordingly, when the air bags are inflated, the inverted channel members form a ramped low friction surface which will receive successive articles from the moving belts without developing significant crushing pressures between adjacent articles.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
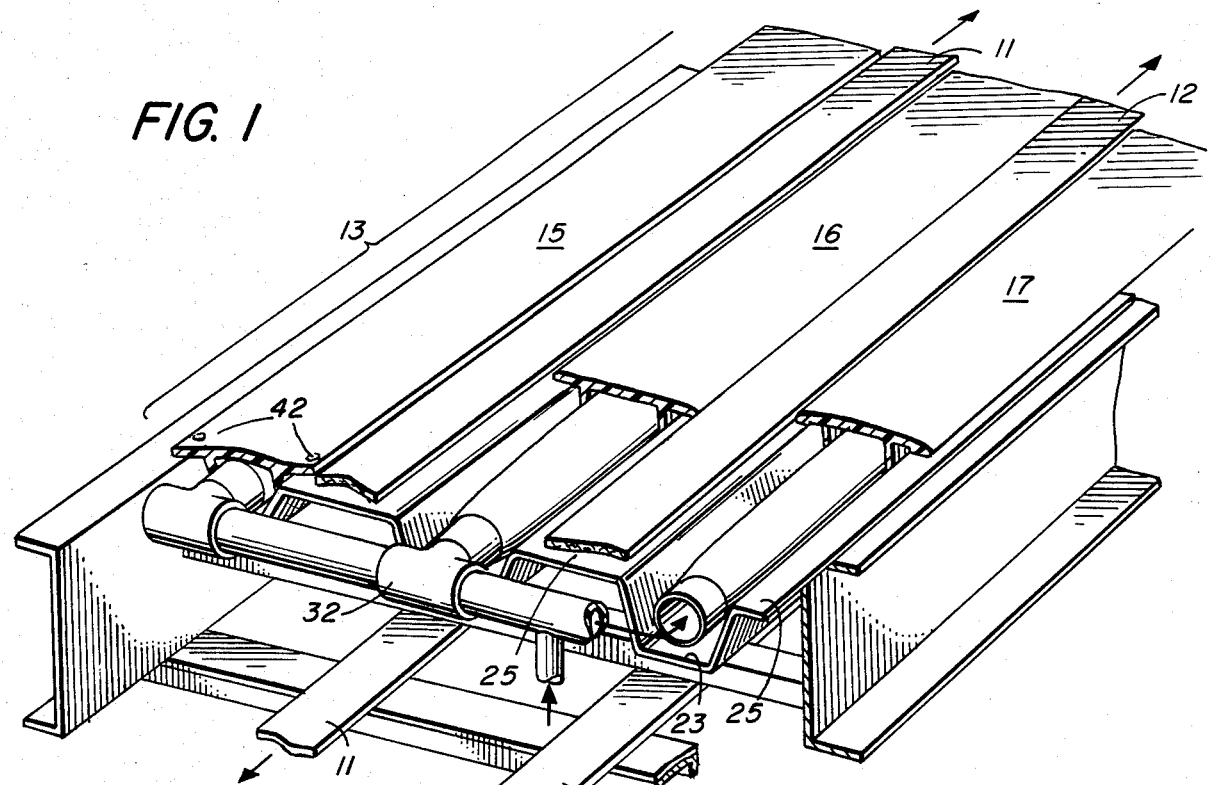
FIG. 1 is a perspective view illustrating a conveyor system employing accumulation apparatus according to the present invention.

Referring now to FIG. 1, the conveyor system illustrated there is generally of the type in which articles, e.g. cartons, are transported on continuously moving parallel belts, such belts being designated by a reference characters 11 and 12. The conveyor system includes an accumulation section designated generally by a reference character 13. In the accumulation section 13, lifting assemblies 15-17 are interleaved with the belts 11 and 12. Preferably, each belt is bracketed by lifting assemblies so that there will typically be N+1 lifting assemblies in a conveyor system employing N parallel belts.

Figure 2:
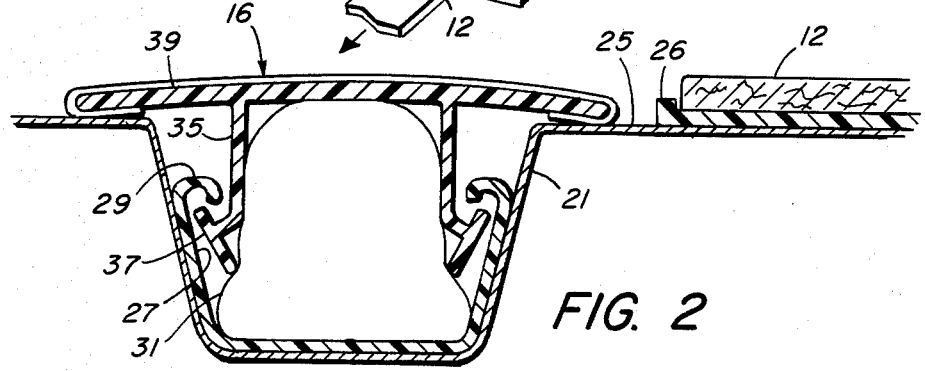
FIG. 2 is a sectional view illustrating the cross-section of one of the elongate lifting assemblies which are interleaved with the moving belts of the conveyor system of FIG. 1.

A presently preferred manner of assembling the lifting assemblies with the belts is illustrated in FIGS. 1 and 2. A corrugated steel plate 21 provides a plurality of upwardly facing U-shaped channels 23 separated by flat lands or ways 25. Each channel is lined by a U-shaped plastic extrusion 27 which provides an inwardly facing lip 29 on each side of the channel. A suitable material is polyvinyl chloride. Received in each channel 23 is an elongate air bag 31. The air bags may be selectively inflated or deflated through a manifold structure, indicated generally by reference character 32. While the plastic extrusions 27 would not themselves be rigid, the channels 23 within the corrugated steel plate 21 do provide a very rigid structure backing the extrusions 27 and thus the U-shaped channels in which the air bags rest may, as a whole, be considered to be essentially rigid. As may be seen in FIGS. 1 and 2, the belts 11 and 12 run along and are supported by the lands or ways. Each land 25 can be covered with a strip 26 of a plastic having a very low coefficient of friction, e.g., teflon, for the respective belt to run in.

Overlying each air bag is an inverted U-shaped channel member 35 which is constructed as an extrusion of a suitable plastic, e.g., polyvinyl chloride. As will be understood, such extrusions will be relatively flexible in the longitudinal direction, that is, as compared with the upwardly facing channels which are backed by the steel plate 21. On each side of the inverted channel member 35 outwardly facing lips 37 are provided each of which is adapted to engage a respective inwardly facing lip 29 on the extrusion 27. The engagement of these lips upon inflation of the respective air bag locally limits upward movement of the inverted channel member 35.

Figure 3:
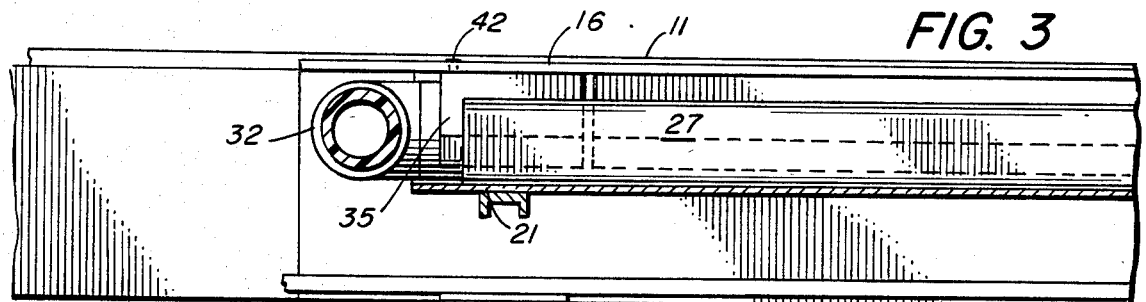
FIG. 3 is a longitudinal cross-section of the lifting assembly illustrating the operation in the lowered or release position.

A low friction surface is provided on the top of each inverted channel member by a cap of a suitable slippery plastic, e.g., teflon or high-density polyethylene, designated by a reference character 39. When the air bag 31 is deflated, the top surface each lifting assembly 15-17 is well below the driving surfaces of the belts 11 and 12 as illustrated in FIG. 3. However, when the air bag is inflated, the channel 35 and the strip 39 are raised so that the top surface of the strip 39 will lift articles on the conveyor out of driving contact with the moving belts. As will be understood, this height is locally determined and limited by the engagement of the mating lip surfaces 29 and 37. In that the channel/air bag arrangement provides a large lifting area, only a relatively low air pressure, e.g., 3-4 psi is needed to provide adequate lift in most instances. As is understood, such pressures may be generated by relatively simple blowers as compared with complex compressers.

Figure 4:
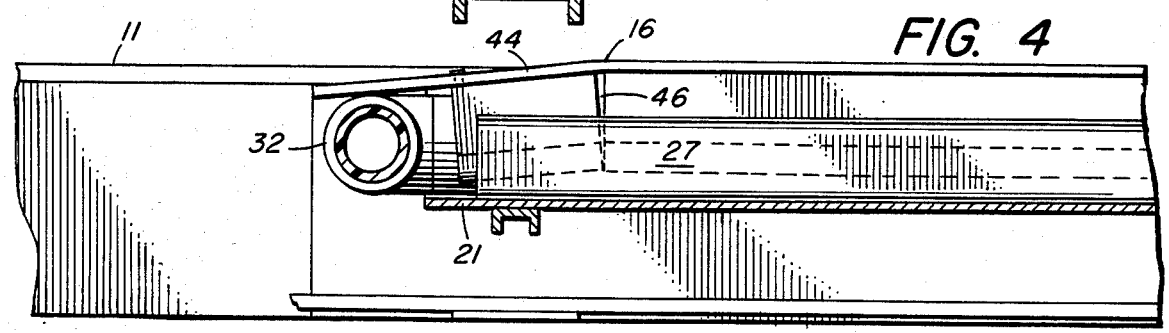
FIG. 4 is a similar longitudinal sectional view illustrating the action of the lifting assembly in a raised state during article accumulation.

The ends of the inverted channel members 35 are secured to the plate 21, e.g., by screws 42 so as to be fixed and are thereby restrained so as to prevent their being lifted by the air bags. The channel members 35, however, are longitudinally flexible, as noted previously. Thus, upon inflation of the air bag, a ramped surface is provided at the entrance of the accumulator section 13, as indicated at 44 in FIG. 4. If desired, the flexibility of the inverted channel members 35 may be increased near their ends by notching as indicated at reference character 46. With the ramped surface thereby formed and the low friction top surface on the lifting assemblies, the belts 11 and 12 can easily drive an article such as a carton up onto the lifting assemblies where the carton will then stop since it is raised out of engagement with the belts. In that the low friction surface provides modest deceleration, relatively high transport speeds are possible. Further, successive articles encountering the actuated lifting assemblies will merely drive preceding articles further onto the accumulation section, without developing significant crushing pressures between adjacent articles. It can thus be seen that it is not necessary to provide a holding section for each article to be stopped but rather a considerable number of articles may be accumulated on a single section and then released individually or collectively by brief or sustained deflation of the air bags 31, depending on conditions downstream of the accumulation section and the desired control algorithm to be implemented. Further, unlike many prior art systems, stopping and accumulation on inclines and declines is readily implemented.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a conveyor system of the type in which articles are transported on continuously moving parallel belts, article accumulation apparatus comprising:
   interleaved with said belts, a plurality of elongate lifting assemblies each of which includes,
   an elongate air bag;
   an upwardly facing U-shaped rigid channel member for receiving said air bag;
   an inverted U-shaped channel member overlying said air bag, said inverted channel member being relatively flexible in the longitudinal direction;
   at each end of each inverted channel member, means for securing the upper surface of the respective end of the inverted channel member at a level below that of the moving belts;
   whereby, when the air bags are inflated, the moving belts can drive successive articles up onto the resulting ramped surface of the inverted channels;
   and further comprising respective, mutually engageable lip means on said rigid and flexible channel members for limiting upward movement of said flexible channel member upon inflation of the respective air bag.

2. In a conveyor system of the type in which articles are transported on continuously moving parallel belts, article accumulation apparatus comprising:
   interleaved with said belts, a plurality of elongate lifting assemblies each of which includes,
   an elongate air bag;
   an upwardly facing U-shaped rigid channel member for receiving said air bag, the width of said channel being comparable to that of said belts;
   an inwardly facing lip on each side of said U-shaped channel;
   an inverted U-shaped channel member overlying said air bag, said inverted channel member being relatively flexible in the longitudinal direction, the upper surface of said inverted channel being constructed of a material having a low coefficient of friction;
   on each side of said inverted channel member, an outward facing lip adapted to engage a respective inwardly facing lip on said rigid channel and thereby locally limit upward movement of said inverted channel upon inflation of said air bag to a height sufficient for lifting articles being transported on said conveyor out of driving contact with said moving belts; and,
   at each end of each inverted channel member, means for securing the upper surface of the respective end of the inverted channel member below the level of the moving belts;
   whereby, when the air bags are inflated, the moving belts can drive successive articles up onto the resulting ramped surface of the inverted channels without developing significant crushing pressures between adjacent articles.

3. Accumulation apparatus as set forth in claim 2 wherein said inverted U-shaped channel member is extruded from polyvinyl chloride and the top surface of said inverted channel is covered with a layer of teflon.

4. A conveyor system comprising:
   a corrugated steel plate providing alternating channels and lands;
   aligned with each of said lands, a longitudinally movable conveyor belt;
   in each of said channels, an elongate U-shaped plastic extrusion which lines said channel and which provides, on each side of said channel, an inwardly facing lip;
   in each of said extrusions, an elongate air bag;
   an inverted U-shaped channel member overlying each of said air bags, said inverted channel member being relatively flexible in the longitudinal direction, the upper surface of said inverted channel being constructed of a material having a low coefficient of friction;

on each side of said inverted channel member, an outward facing lip adapted to engage a respective inwardly facing lip on said rigid channel and thereby locally limit upward movement of said inverted channel upon inflation of said air bag to a height sufficient for lifting articles being transported on said conveyor out of driving contact with said moving belts; and, at each end of each inverted channel member, means for securing the upper surface of the respective end of the inverted channel member below the level of the moving belts;

whereby, when the air bags are inflated, the moving belts can drive successive articles up onto the resulting ramped surface of the inverted channels without developing significant crushing pressures between adjacent articles.

5. Accumulation apparatus as set forth in claim 4 wherein said channel members are extruded polyvinyl chloride and wherein the top surface of said inverted channel member is covered with a layer of teflon.

* * * * *